United States Patent [19]

Brill

[11] 4,207,809
[45] Jun. 17, 1980

[54] DUAL RESERVOIR COFFEE URN

[75] Inventor: Frank D. Brill, Norridge, Ill.

[73] Assignee: Restaurant Technology, Inc., Oak Brook, Ill.

[21] Appl. No.: 888,164

[22] Filed: Mar. 20, 1978

[51] Int. Cl.² .................. A47J 31/40; A47J 31/50; A47J 31/54
[52] U.S. Cl. ........................... 99/279; 99/295; 99/306; 99/316; 99/323.3
[58] Field of Search ............ 99/280, 281, 282, 283, 99/298, 304, 305, 295, 316, 323.3, 279

[56] References Cited

U.S. PATENT DOCUMENTS

| 2,485,246 | 10/1949 | Swanson | 99/283 |
| 3,517,603 | 6/1970 | Bruenjes | 99/305 |

Primary Examiner—Robert W. Jenkins
Attorney, Agent, or Firm—Dressler, Goldsmith, Shore, Sutker & Milnamow, Ltd.

[57] ABSTRACT

A coffee brewing and serving machine is provided with an upper housing portion from which hot water is dispensed in a downwardly flowing stream through a removably mounted, large funnel containing a large foraminous basket in which is disposed filter paper and coffee grounds. Below the outlet of the funnel is a lower housing portion containing a coffee tank having a vertical wall dividing the tank into two substantially equal sized coffee holding urns. An urn cover is supported on an upper portion of the lower housing portion over the coffee tank. The urn cover has an orifice in vertical alignment with, and below, the funnel outlet. Further there is a channel-shaped diverter trough on the underside of the cover below, and in alignment with, the cover orifice. The cover is adapted to be rotated on the top of the lower housing about a vertical axis passing through the cover orifice and funnel outlet whereby the stream of brewed coffee from the upper housing passing through the funnel and cover orifice can be directed by the diverter trough to either one of the two coffee holding urns. A small funnel and basket assembly are provided and adapted to fit within the large funnel and basket assembly for use in making a smaller batch of coffee. Annunciator systems are provided to alert the operator to remove used grounds after a batch of coffee has been brewed and to dispose of brewed coffee that has been held in an urn beyond a predetermined period of time.

22 Claims, 4 Drawing Figures

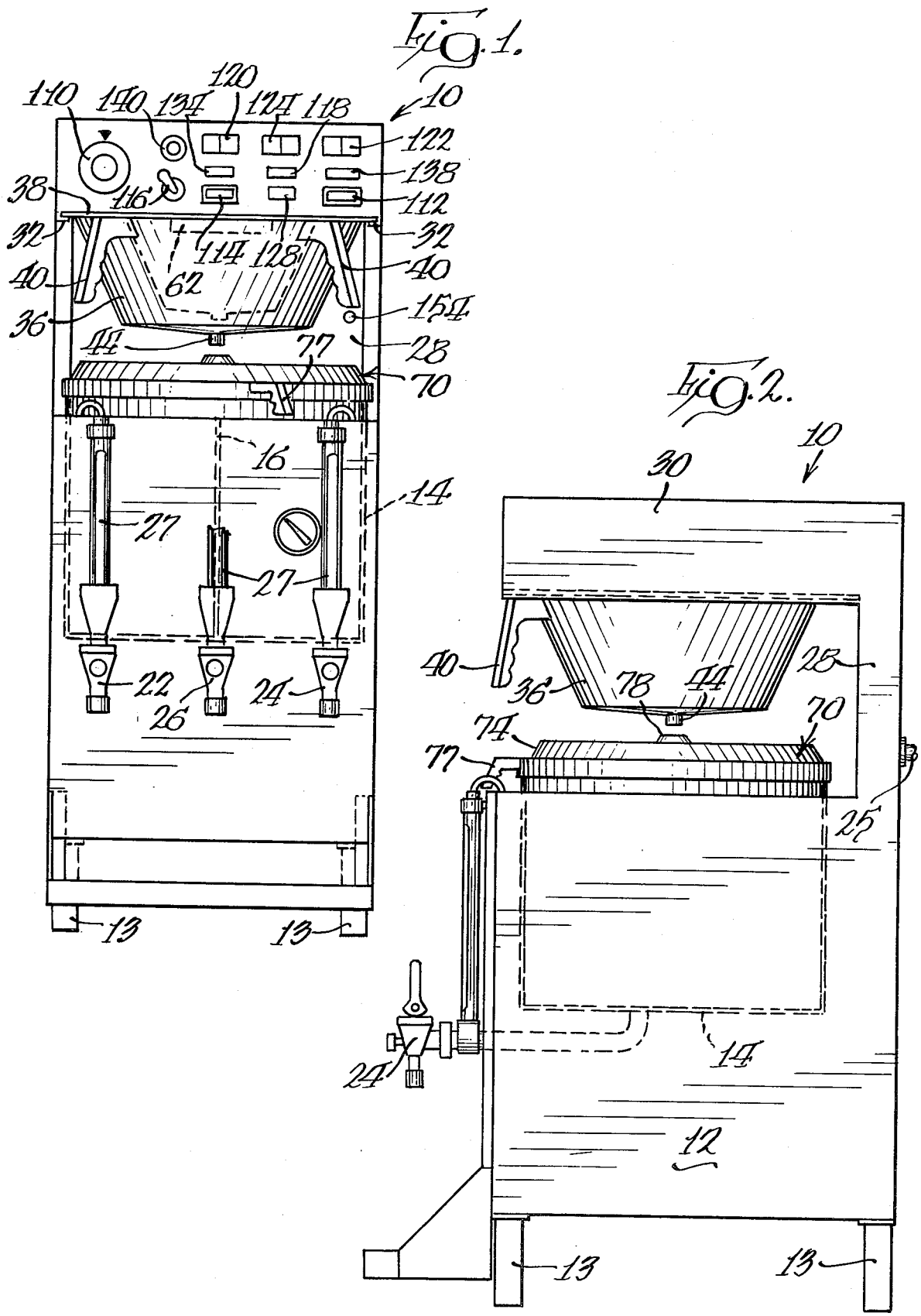

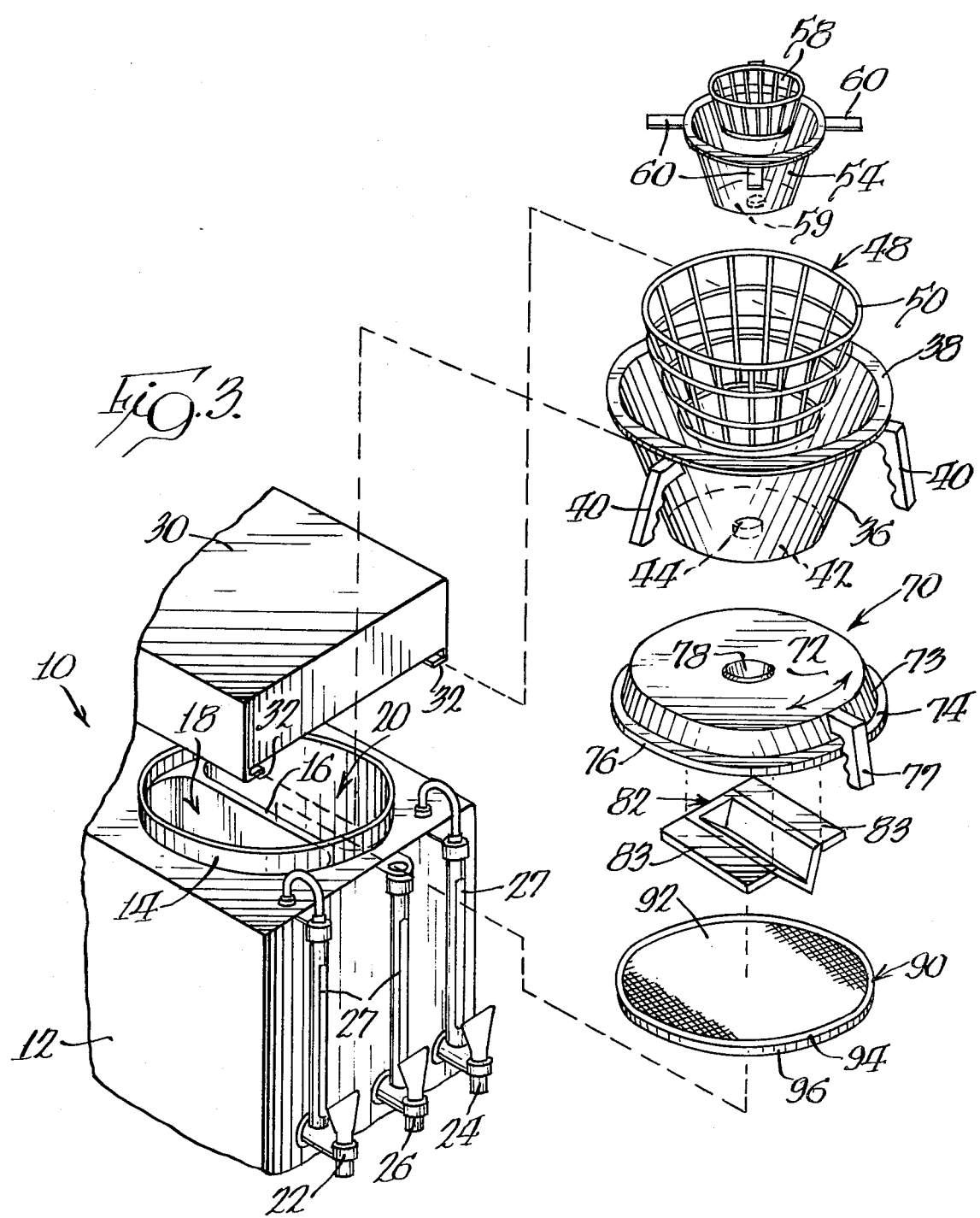

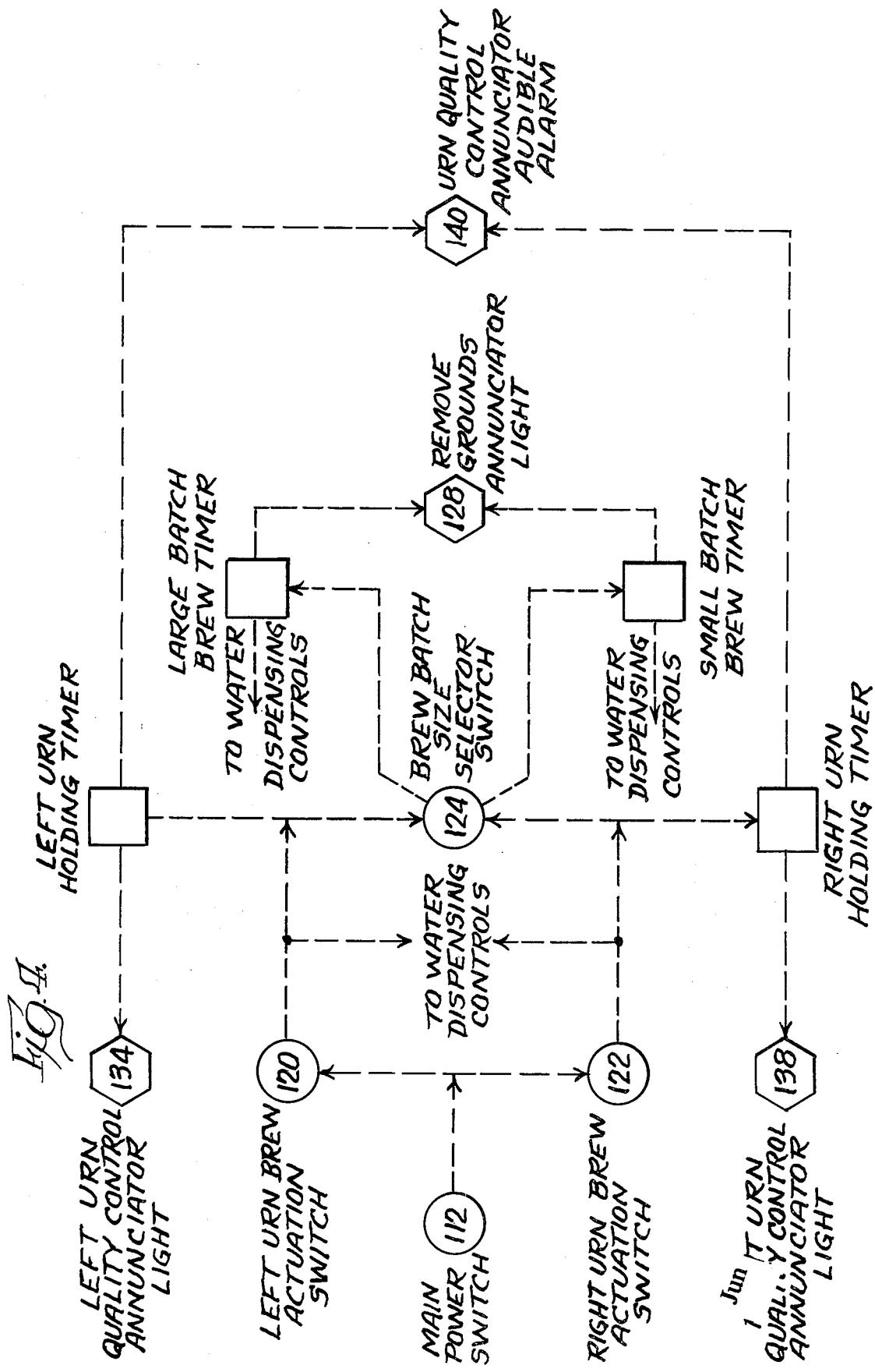

DUAL RESERVOIR COFFEE URN

BACKGROUND OF THE INVENTION

This invention relates generally to automatic coffee making and dispensing machines, and more particularly concerns an improved type of automatic coffee making and dispensing machine wherein hot water is directed downwardly through fresh coffee grounds held in a filter assembly and where the resulting liquid coffee is collected in a reservoir and maintained at a desired elevated temperature for subsequent dispensing in individual servng cup amounts.

Automatic coffee machines of the type to which this invention relates generally have an upper portion in which a cloth or paper filter assembly is held and a lower portion incorporating a single tank for receiving the resulting hot coffee which flows from the coffee grounds and through the filter assembly to the tank below.

Such automatic machines are used in large-scale food serving and preparing operations such as in restaurants, cafeterias, fast-food service facilities, and the like.

If only one coffee making machine is used in a food service facility, a second batch of coffee cannot be made in that machine until the first batch in that machine is used up or otherwise disposed of. Consequently, if only one such machine is used, there is a period of time after a first batch of coffee has been completely dispensed before the next batch of coffee is brewed and ready for serving. Consequently, to avoid this problem, food service facilities frequently have had to install two or more such coffee making machines so that one machine may be brewing a batch of coffee while the other one is used for holding and dispensing a batch of already brewed coffee. This of course is disadvantageous from the standpoint of the capital investment required to purchase more than one machine, from the standpoint of increased facility space required to accommodate more than one machine, and from the standpoint of increased labor required to maintain, operate, and clean the many parts associated with more than one machine.

Another problem with using a coffee making machine in a food service facility is that the capacity of the machine must be large enough to handle the peak capacity requirement (typically during meal times or coffee break times) and that at the non-peak capacity times, more coffee is frequently made and held for serving than is really necessary. One solution to this problem is to provide in a food service facility, in addition to one or more large coffee making machines, one or more smaller coffee making machines for use during the off-peak capacity times. This, of course, is disadvantageous from the standpoint of increased capital investment, increased labor, etc.

Another problem with many coffee making machines in use in food service facilities is that the facility staff must be relied upon to remember to remove the used coffee grounds from the coffee machine after the initial brewing of the batch of coffee has been completed in order to prevent drippings of the coffee grounds from falling into the batch of coffee below. This is important because drippings from coffee grounds are generally very concentrated with coffee ground residue and can add an undesirable, bitter component to the brewed coffee.

Another problem with many coffee making machines is that the brewed coffee can sit in the holding reservoir for many hours and there is no automatic way of alerting the food service facility staff as to how long the brewed coffee has been held in the machines. It has been found that coffee that has been held for a long period of time is not as fresh as newly brewed coffee and does not taste, to many people, as good as newly brewed coffee. Consequently, if an operator (waiter, waitress, etc.) does not know how long coffee has been held in the coffee machine, it is likely that coffee may be served which is not as good as freshly brewed coffee.

It would be desirable to dispose of coffee that has been held too long in a coffee machine and to brew a new batch of coffee after some predetermined time period in order to maintain an acceptable taste quality of the coffee. With many conventional coffee making machines, such a program can be undertaken only if the operators are conscious of this situation and are able to keep track of the time at which the various batches of coffee were first brewed. This of course is difficult in food service facilities where the staff changes throughout the day owing to a number of specific work shifts.

In view of the above described disadvantages found in many of the coffee making machines in use today, it would be desirable to provide a single machine which would take up a minimum amount of food service facility space and which would have the capacity for brewing one batch of coffee while holding another brewed batch of coffee for immediate use.

It would also be desirable to provide such a machine with features that would allow it to brew a substantially smaller batch of coffee for use during the off-peak capacity hours.

It would be beneficial if such a machine would also have automatic signalling or alarm devices to alert the operator when the coffee brewing cycle had been completed so that the used coffee grounds could be removed.

Additionally, it would be helpful if signals or alarms were provided for alerting the operator when the brewed coffee had been held in the coffee machine longer than some predetermined time period so that the operator would know to brew a new batch of coffee and to empty the "stale" batch of coffee.

It would also be desirable to provide a secondary grounds catching assembly below the usual filter assembly to prevent spent grounds from entering the finished brew and causing a bitter aftertaste in the coffee because of overextraction. Such a grounds catching assembly would also prevent the brewed coffee dispensing piping and faucet valves from being plugged up by such grounds.

SUMMARY OF THE INVENTION

According to the present invention, a novel coffee making machine is provided with a lower coffee reservoir and dispensing housing and an overhanging upper brewing and dispensing assembly spaced above, and supported from, the lower housing portion. The whole machine is very compact, and in the preferred embodiment, is about 35 inches high, 14 inches wide, and 18 inches deep. It can hold, in two separate batches, a total of about four gallons of brewed coffee.

The lower housing holds a tank within a water jacket and also contains the hot water and coffee dispensing faucets, associated plumbing, temperature indicators and switches, all of which are Additional plumbing is provided to bring water from the lower housing to the upper housing. In the upper housing there is a conventional spray nozzle and associated automatic valves and plumbing for distributing water downwardly over coffee grounds that are retained in a filter paper-lined, wire mesh brew basket supported within a funnel projecting from the lower portion of the upper housing.

An aperture is provided in the bottom of the funnel to allow water to pass through the coffee grounds and out the bottom of the funnel, downwardly in a stream toward the coffee tank in the lower housing.

A cover assembly is supported on the top surface of the lower housing over the coffee tank. The cover has an orifice in alignment with the downwardly flowing stream of coffee from the upper housing. Below the orifice a diverter is provided. Preferably the diverter is secured to the cover immediately below the aperture and comprises a singly open-ended V-shaped trough for deflecting the flow of coffee laterally a few inches. By properly positioning the cover, the open end of the trough can be directed to discharge the coffee into one or the other of the two urns as desired.

Many of the electrical control circuits and associated switches necessary for proper operation of the machine are contained in the upper housing. In particular, timers and alarms, such as a flashing light, are provided to alert the operator to remove the used coffee grounds after the brewing has been completed. If the grounds were not removed, the water absorbed by the grounds can continue to drip intermittently into the coffee holding urn below. Such water contains overextracted coffee and can add a bitter taste to the freshly brewed coffee in the urn.

Another timer and alarm system is provided to alert the operator that coffee in a holding urn has been held one hour. Since coffee held longer than one hour tends to have a decrease in taste quality, the coffee can be disposed of by the operator.

In the preferred embodiment of the present invention, a first, large funnel and brewing basket is provided to hold sufficient coffee grounds for brewing a large batch of coffee (e.g., about two gallons). For use in off-peak capacity periods, a special insert small funnel and associated small brewing basket are provided to be inserted and held within the first, large funnel/basket assembly and are adapted to hold a smaller amount of coffee grounds for brewing a smaller batch of coffee (e.g., about one-half gallon).

Numerous other advantages and features of the present invention will become readily apparent from the following detailed description of the invention and of one embodiment thereof, from the claims and from the accompanying drawings.

Thus, it is seen that the combined effect of the various elements associated in accordance with the present invention is not merely equal to the sum of the several effects of those elements alone. Rather, the novel combination of elements in accordance with the present invention yields a desirable and synergistic result, a result which is a substantial improvement over the prior art.

BRIEF DESCRIPTION OF THE DRAWINGS

In the accompanying drawings forming part of the specification, and in which like numerals are employed to designate like parts throughout the same, FIG. 1 is a front elevation view of a coffee machine of the present invention;

FIG. 2 is a side elevation view of the coffee machine of FIG. 1;

FIG. 3 is a fragmentary, exploded, perspective view of the coffee machine of FIG. 1; and FIG. 4 is a simplified block diagram of the timer and alarm control system of the coffee machine of FIG. 1.

DESCRIPTION OF THE PREFERRED EMBODIMENT

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated.

The precise shapes and sizes of the components herein described are not essential to the invention unless otherwise indicated, since the invention is described with only reference to an embodiment which is simple and straightforward.

For ease of description, the apparatus of this invention will be described in a normal operation position, and terms such as upper, lower, horizontal, etc., will be used with reference to this normal operating position. It will be understood, however, that the apparatus of this invention may be manufactured, stored, transported and sold in an orientation other than the normal operating position described.

The apparatus of this invention has certain conventional piping and faucet systems, electrical heater element systems, automatic valve control systems, and electrical/electronic switch, timer, and control systems, the details of which, though not fully illustrated or described, will be apparent to those having skill in the art and an understanding of the necessary functions of such systems and mechanisms.

According to the method of the present invention, discrete quantities of coffee can be conveniently brewed and held at a desired elevated temperature. A mass of fresh coffee grounds is held in a substantially uniform density configuration. A stream or spray of hot water is directed downwardly through the mass of grounds. The water is collected after passing through the grounds and funnelled to form a downwardly flowing stream of coffee. A plurality of receiving and holding urns are provided below the downwardly flowing stream. Finally, the downwardly flowing stream of coffee is selectively deflected into a desired one of the plurality of urns. Further, to make a second batch of coffee, the first mass of coffee grounds is disposed of and a second, new mass of coffee grounds is provided. Again, a spray of hot water is directed downwardly through the mass of grounds and funnelled to form a downwardly flowing stream of liquid coffee below the mass of grounds. The downwardly flowing stream of coffee is then deflected or diverted to a second urn of the plurality of urns.

The coffee machine of the present invention is designated generally as 10 in FIGS. 1, 2, and 3. The machine has a lower housing portion 12 supported on legs 13 as best illustrated in FIGS. 1 and 2. The lower housing portion 12 contains a generally cylindrical tank 14 which is divided by an integral vertical wall means or wall 16 into two substantially equal sized, coffee holding urns 18 and 20 as best illustrated in FIG. 3.

The tank 14 is preferably constructed from 18 gauge-type 304 stainless steel with all seams in liquid contact properly welded and suitably finished. Each urn 18 and 20 is also preferably equipped with a conventional air agitator system, which at prescribed times, automatically agitates both urns simultaneously in order to maintain coffee quality.

As in conventional coffee making machines, the space immediately surrounding the exterior of the tank 14 is a water jacket in which water is maintained at an elevated temperature to keep the tank 14 and the contents thereof at a desired elevated temperature.

Also, as in conventional coffee making machines, conduits are provided at the bottom of the tank for extracting coffee or hot water from the tank 14. In the case of the present invention, lines are provided for each coffee holding urn 18 and 20 and connect with exterior valve faucets, such as faucet 22 associated with urn 18 and faucet 24 associated with urn 20. A faucet 26 is directly connected to the hot water jacket surrounding the tank 14 for supplying hot water directly. The faucets are of the conventional type used in coffee making machines and may include grounds catcher screens. The faucets each have a site glass and protection tube 27. The faucets 22 and 24 associated with the urns 18 and 20 respectively may also be equipped with the usual air agitation check loops.

Various conventional controls are preferably provided within the lower housing portion 12 to, among other things, maintain the hot water jacket system and to automatically maintain water level within the jacket. Electrical and water supply connections may be made at the rear of the lower housing portion 12, as with conduit 25, illustrated in FIG. 2.

Towards the rear of the lower housing portion 12, as best illustrated in FIG. 2, a portion 28 of the lower housing extends upwardly beyond and above the top of the tank 14. An upper housing portion 30 is cantilevered from this portion 28 and extends outwardly over, and spaced away from, the top of the tank 14 in the lower housing portion 12.

As best illustrated in FIGS. 1 and 3, the bottom of the upper housing portion 30 has, on each side, L-shaped flanges 32 which are adapted to mount a first brewing assembly. Flanges 32 receive and hold a portion of a first large funnel 36. The funnel 36 is removably supported on the flanges 32 in close fitting contact wih the underside of the upper housing portion 30. As best illustrated in the exploded view in FIG. 3, the funnel 36 is generally cone-shaped with an upper peripheral flange 38 for engaging the support flanges 32. The funnel also has two handles 40 projecting from the flange 38 by which an operator may insert or remove the funnel 36. The funnel 36 further has a slightly convex bottom 42 (when viewed from the exterior), which bottom 42 defines an aperture 44 therein. Preferably, the aperture 44 is concentric with the circular cross section of the funnel.

The funnel 36 is adapted to receive therein a first, large, generally cone-shaped brew basket 48 formed from a plurality of wires 50. The exterior of the basket 48 touches, and is supported by, the interior surface of the funnel 36. The basket 48 is adapted to receive a conventional coffee filter paper in which a measured amount of coffee grounds is placed prior to brewing the coffee.

The first, large funnel 36 and the first, large brewing basket 48 are used for preparing the large batches of coffee (e.g., about two gallons). Should it be desired to brew a smaller batch of coffee (e.g., about one-half gallon), a novel assembly comprising a second brewing assembly including a smaller funnel 54 and a second, smaller brew basket 58 formed of wire is provided for insertion in the assembly of the larger funnel 36 and brew basket 48. The small funnel 54 has a plurality of outwardly projecting support tabs or lugs 60 which engage the upper rim of the larger brew basket 48 and support the small funnel 54 generally concentrically therein. The small funnel 54 is generally conical in shape and has a somewhat convex bottom 59 (when viewed from the exterior), which bottom 59 defines therein an outlet aperture 60 which is preferably concentric with the base of funnel 54.

A smaller size filter can be used in the second, smaller brew basket 58 to hold a smaller amount of coffee grounds. When the large funnel 36 is properly engaged with the support flanges 32 in the upper housing of the coffee making machine as illustrated in FIGS. 1 and 2, water may be sprayed directly into the coffee grounds held in the brew basket (brew basket 48 if the large batch is to be made, or brew basket 58 if a smaller batch of coffee is to be made).

To provide water spray over the coffee grounds, the upper housing contains within it an actuatable dispensing means for dispensing hot water from the upper housing upon demand. Such a dispensing means includes a spray nozzle, schematically illustrated by dashed line at 62 in FIG. 1, and associated valves and other conventional mechanisms well known to those skilled in the art. The water is evenly sprayed and distributed onto the coffee grounds and allowed to permeate and drip through the coffee grounds.

As the water flows through the coffee grounds, coffee goes into solution in the water to form the usual liquid coffee which then flows downwardly and out through the filter paper, through the basket, through the aperture in the funnel and then downwardly towards the tank 14 in the lower housing.

As can be readily seen in FIGS. 1 and 3, the tank center wall 16 lies directly below the outlet orifice 42 of the funnel 36. If nothing else were done, the coffee stream would impinge upon the top of the wall 16. To direct the downwardly flowing stream of coffee to one of the urns 18 and 20, diverter means are mounted above the tank 14 for redirecting the downwardly flowing stream and for selectively directing the stream into one of the urns. This may take the form of an oscillatable plate against which the coffee stream pours to be diverted into one or the other of the urns. Preferably, the diverter means is directly connected to an urn cover 70.

With reference to FIG. 3, a preferred urn cover 70 comprises a generally circularly-shaped central planar portion 72 having a depending conically configured wall portion 73 and an outwardly extending peripheral support shoulder or flange 74 terminating in a downardly extending shroud portion 76. The cover 70 preferably has a handle 77. The central cover portion 72 defines therein a circular cover orifice 78 to allow the passage of the downwardly flowing coffee stream therethrough.

In a presently preferred embodiment the diverter means comprises a channel-shaped diverter trough 82 which is secured to the underside of the central cover portion 72 in alignment with the orifice 78. As can be best seen in FIG. 3, the trough 82 is generally V-shaped, closed at one end, open at the other end, and downwarly slanting towards the open end. The trough may be formed integrally with the cover 70 or may be secured thereto, via connection flanges 83, as by riveting or welding.

Preferably, the channel-shaped diverter trough 82 is oriented on the central cover portion 72 so that the open end of the trough 82 points to, or is in alignment with, the handle 77 of the cover 70. The whole cover 70 is adapted to be supported via shoulder 74 on the tank 14 and is adapted to be oriented in at least positions, preferably by rotating the cover between the two positions. Thus, the cover 70 can be oriented so that the outlet or opening of the channel shaped diverter trough 82 is over a selected one of the two urns 18 and 20. In this way, the coffee stream flowing through the orifice 78 of the cover 70 is directed to a desired coffee urn. If the channel-shaped diverter trough 82 is aligned with the handle 77 of the cover 70 as described above, then an operator of the coffee machine will know that the diverter trough 82 is directed to divert the coffee into whichever urn the handle 77 overhangs. In addition, or alternatively, other indicia of trough orientation could be affixed to the cover 70.

In order to provide an extra measure of protection to prevent unwanted coffee grounds or other foreign material from entering the urns 18 and 20 and plugging up the faucets or affecting the taste of the coffee, a grounds catcher screen 90 is preferably provided for mounting at the top of the tank 14 below the cover 70 as best illustrated in FIG. 3. The grounds catcher screen 90 comprises a porous cloth 92 retained at its periphery between two concentric bands 94 and 96. The grounds catcher screen 90 is placed within the top of tank 14 and is supported by the upper surface of wall 16.

Various controls, switches, gauges, alarms and signal devices are provided on the front face of the upper housing 30 as best illustrated in FIG. 1. Such controls may include a thermostat 110; a main power switch 112; an agitation switch 114; a three-position switch 116 for rinse and manual brew/off/manual water fill; and brewing light 118. An emergency water shut-off switch 154 may be provided beneath the lower housing on the raised rear portion 28 of the lower housing.

Preferably, the brewing and filling of each urn is controlled by separate brew actuation means, including switches such as a left brew switch 120 (associated with the left urn when facing the machine) and a right brew switch 122 (associated with the right urn when facing the machine). To accommodate the two different sized coffee brewing batches (i.e, the large batch and the smaller batch) a brew batch size switch 124 is provided.

Timers are associated with, and interlocked with some of the switches as best illustrated in FIG. 4. Two brew batch timers (a large brew batch timer and a small brew batch timer) are associated with the brew batch size selection switch 124 for controlling the length of time water is dispensed over the coffee grounds. When a brew actuation means (including switch 120 or 122 and the associated control valving) is actuated to dispense hot water, the selected brew timer is also actuated to, after a predetermined timing period, deactuate the hot water dispensing means (the automatic actuatable dispensing valves) to terminate dispensing hot water.

Since it is desired to remove the coffee grounds from the funnel assembly in the upper housing after the coffee has been brewed to prevent bitter drippings from falling into the brewed coffee, a "remove grounds" alert first visual signal light 128 is also provided. The light 128 is electrically connected with the large and small brew batch timers so that the light 128 is actuated or energized after a predetermined time period following the actuation of one of the associated brew actuation means or switches 120 or 122, thereby alerting the operator to remove the coffee grounds.

A pair of second visual signal means, or quality control lights, 134 and 138, are provided to alert the operator that coffee has been held in one of the urns longer than a predetermined time period, say one hour, and should be disposed of since it may have suffered a degradation of taste quality. Specifically, each of the quality control lights 134 and 138 is associated with one of the urns 18 or 20. Light 134 is associated with left urn 18 and light 138 is associated with right urn 20. A second pair of timers are associated with the respective left and right brew actuation switches 120 and 122 and with the respective left and right quality control lights 134 and 138. When a brew actuation switch 120 or 122 is actuated, the associated second timer begins timing out and after a predetermined period, such as one hour, energizes the associated quality control light to alert the operator that the coffee has been held in the urn for that period of time and should be disposed of. Also, both lights may be interlocked with a single sonic alarm 140 to provide an additional notification of the operator. Preferably, the quality control lights 134 and 138 incorporate a switch mechanism which can be pressed by the operator to terminate the visual signal and audible alarm from the sonic alarm 140 after they have been actuated. This will serve as an acknowledgement by the operator of the alarm condition and will reset the timing and alarm system for another brew cycle.

The coffee machine of the present invention is typically operated by brewing a first batch of coffee in one urn and, while that first batch of coffee is being dispensed cup by cup or otherwise from the faucet associated with that urn, a second batch of coffee can be brewed and held in the other urn.

From the foregoing, it will be observed that numerous variations and modifications may be effected without departing from the true sprit and scope of the novel concept of the invention. It is to be understood that no limitation with respect to the specific apparatus illustrated herein is intended or should be inferred. It is, of course, intended to cover by the appended claims all such modifications as fall within the scope of the claims.

What is claimed is:

1. In a coffee brewing and serving machine in which hot water is dispensed in a downwardly flowing stream and which has a lower housing portion for receiving, holding and dispensing brewed coffee at a desired elevated temperature, the improvement comprising:

a tank within said lower housing portion, said tank having wall means dividing said tank into a plurality of liquid holding urns;

brewing and dispensing assembly means for holding a quantity of coffee under said downwardly flowing stream of hot water and for discharging a downwardly flowing stream of brewed coffee; and diverter means mounted above said tank, below said brewing and dispensing assembly means, for redirecting said downwardly flowing stream of brewed coffee, said diverter means adapted to be oriented above said tank in at least as many positions as there are holding urns whereby the flow of brewed coffee from said brewing and dispensing assembly means can be selectively directed into any one of said liquid holding urns.

2. In a coffee brewing and serving machine having an upper housing portion from which hot brewed coffee or hot water is dispensed in a downwardly flowing stream and having a lower housing portion for receiving, holding and dispensing said brewed coffee or hot water at a desired elevated temperature, the improvement comprising:

a tank within said lower housing portion, said tank having wall means dividing said tank into a plurality of liquid holding urns;

a first, large brewing assembly mounted on said upper housing portion above said lower housing portion for brewing a first large quantity of coffee and further including a second, small brewing assembly adapted to be disposed within said first, large brewing assembly for brewing a second, substantially smaller quantity of coffee; and diverter means mounted above said tank for redirecting said downwardly flowing stream of hot brewed coffee or water, said diverter means adapted to be oriented above said tank in at least as many positions as there are holding urns whereby the flow of brewed coffee or water from said upper housing portion can be selectively directed into any one of said liquid holding urns.

3. In a coffee brewing and serving machine having an upper housing portion from which hot brewed coffee or hot water is dispensed in a downwardly flowing stream and having a lower housing portion for receiving, holding and dispensing said brewed coffee or hot water at a desired elevated temperature, the improvement comprising:

a tank within said lower housing portion, said tank having wall means dividing said tank into a plurality of liquid holding urns;

a lower housing portion urn cover removably supported on said lower housing portion above said tank; and diverter means secured to said urn cover for redirecting said downwardly flowing stream of hot brewed coffee or water, said diverter means adapted to be oriented above said tank in at least as many positions as there are holding urns whereby the flow of brewed coffee or water from said upper housing portion can be selectively directed into any one of said liquid holding urns.

4. A machine in accordance with claim 3 in which said diverter means is a trough and said trough receives said downwardly flowing stream and redirects it selectively into the liquid holding urns.

5. A machine in accordance with claim 3 in which said urn cover has a central cover portion and defines an urn cover opening therein through which said downwardly flowing stream passes, and in which said diverter means is positioned below said urn cover opening to receive and redirect said stream.

6. A machine in accordance with claim 5 in which said diverter means is a trough.

7. In a coffee brewing and serving machine having an upper housing portion from which hot water is dispensed in a downwardly flowing stream and a lower housing portion for receiving, holding, and dispensing brewed coffee at a desired elevated temperature, the improvement comprising:

a first funnel removably mounted to the bottom of said upper housing portion, said funnel having an outlet aperture;

a first foraminous brewing basket removably disposed within said funnel and adapted to hold filter paper and coffee grounds;

a coffee tank within said lower housing portion, said tank having a central, vertical wall dividing said tank into at least two coffee holding urns; and a lower housing portion urn cover removably supported on said lower housing, said urn cover having a central cover portion and a diverter means at the underside of the central cover portion below said cover orifice, said diverter means being adapted to be selectively moved between two positions whereby the downwardly flow of brewed coffee from said upper housing passes to said urn cover diverter means to be directed to one of said coffee holding urns.

8. A machine in accordance with claim 7 wherein said urn cover central portion defines a cover orifice in vertical alignment with and below said funnel outlet aperture and said diverter means is in vertical alignment with said cover orifice.

9. A machine in accordance with claim 8 wherein said diverter means is trough-shaped.

10. A machine in accordance with claim 9 in which said tank is divided into two substantially equal-sized coffee holding urns, said tank being generally cylindrical and wherein said urn cover is generally circular in shape, is seated at the upper regions of said tank and is adapted to be rotated thereon.

11. A machine in accordance with claim 7 wherein said funnel outlet aperture is generally circular and below said coffee flow stream in said upper housing.

12. A machine in accordance with claim 7 wherein said tank is generally cylindrical and wherein said vertical wall defines, in cooperation with the rest of said tank, two semi-cylindrical coffee urns.

13. A machine in accordance with claim 7 further including a grounds catcher screen assembly removably disposed immediately below and adjacent said urn cover.

14. The machine in accordance with claim 13 wherein said vertical wall in said tank has a horizontal upper surface spaced below the top of said tank for supporting said grounds catcher holder and screen.

15. A machine in accordance with claim 7 further including a second funnel removably suspended from the top rim portion of said first funnel within, and spaced from, said first brewing basket.

16. A machine in accordance with claim 15 further including a second foraminous brewing basket removably disposed within said second funnel.

17. The machine in accordance with claim 16 wherein said second basket is adapted to receive filter paper and coffee grounds.

18. The machine in accordance with claim 7 further including an actuatable dispensing means for dispensing hot water from said upper housing portion upon demand for a predetermined brew time period.

19. The machine in accordance with claim 18 further including two brew actuation means, one associated with each urn for actuating said hot water dispensing means to dispense hot water; further including large batch brew timer means and small batch brew timer means; and further including brew batch size selection means for interlocking a selected one of said brew batch timer means with one of said associated brew actuation means to de-actuate said hot water dispensing means to terminate the dispensing of hot water after a predetermined brew time period.

20. The machine in accordance with claim 19 further including a single, first visual signal means electrically interconnected with each said brew batch timer means for energization after a predetermined time period following the actuation of one of the brew actuation means thereby alerting the operator that the coffee grounds should be removed.

21. The machine in accordance with claim 19 further including an audible alarm, two second visual signal means and two holding timer means, one signal means and one holding timer means associated with each urn and electrically interconnected together with said audible alarm and with said two brew actuation means whereby one of said holding timers energizes both said alarm and one of said second visual signal means after a predetermined time period following the actuation of one of said brew actuation means thereby alerting the operator to dispose of the coffee in the associated urn.

22. The machine in accordance with claim 21 further including electrical interlocking means for de-energizing said audible alarm and second visual signal means resulting from a first actuation of one of said brew actuation means when said same one brew actuation means is actuated a second time.

* * * * *

UNITED STATES PATENT AND TRADEMARK OFFICE
CERTIFICATE OF CORRECTION

PATENT NO. : 4,207,809
DATED : June 17, 1980
INVENTOR(S) : Frank D. Brill

It is certified that error appears in the above-identified patent and that said Letters Patent are hereby corrected as shown below:

Col. 2, line 68, after "are" insert -- found in conventional automatic coffee machine. The unique coffee tank is essentially a cylindrical container divided by a central vertical wall into two semi-cylindrical urns. --

Col. 5, line 47, "wih" should be -- with --

Col. 7, line 11, before "positions" insert -- two --

Signed and Sealed this

Nineteenth Day of August 1980

[SEAL]

Attest:

SIDNEY A. DIAMOND

Attesting Officer

Commissioner of Patents and Trademarks